(12) United States Patent
Edrich et al.

(10) Patent No.: US 8,178,798 B2
(45) Date of Patent: May 15, 2012

(54) WEIGHING SYSTEM INCLUDING A PRELOAD WEIGHING TABLE AND CLAMPING DEVICE FOR WEIGHING SEQUENTIALLY FED ITEMS

(75) Inventors: Andreas Edrich, Homburg (DE); Stefan Mildenberger, Kaiserslautern (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 367 days.

(21) Appl. No.: 12/353,164

(22) Filed: Jan. 13, 2009

(65) Prior Publication Data

US 2009/0178860 A1 Jul. 16, 2009

(30) Foreign Application Priority Data

Jan. 14, 2008 (DE) .................... 20 2008 000 567 U

(51) Int. Cl.
*G01G 13/00* (2006.01)
(52) U.S. Cl. .......................................... 177/145; 141/83
(58) Field of Classification Search .................... 141/83; 177/145, 119
See application file for complete search history.

(56) References Cited

U.S. PATENT DOCUMENTS

| | | | | |
|---|---|---|---|---|
| 2,359,786 A * | 10/1944 | Pechy | ............................ | 177/52 |
| 4,122,940 A * | 10/1978 | Hoffmann | ....................... | 177/50 |
| 4,344,493 A * | 8/1982 | Salmonsen et al. | ............. | 177/52 |
| 4,370,888 A * | 2/1983 | Popper | ............................ | 73/580 |
| 4,494,583 A * | 1/1985 | Reeves et al. | ................... | 141/83 |
| 4,538,694 A * | 9/1985 | Hudson | .......................... | 177/145 |
| 4,566,584 A * | 1/1986 | Lindstrom | ..................... | 177/145 |
| 5,014,797 A | 5/1991 | Dolan et al. | | |
| 5,086,855 A * | 2/1992 | Tolson | ............................... | 177/5 |
| 5,137,099 A * | 8/1992 | Tolson | ............................... | 177/5 |
| 5,193,630 A * | 3/1993 | Cane | .................................. | 177/50 |
| 5,236,337 A * | 8/1993 | Kikuchi et al. | .................. | 177/52 |
| 5,576,520 A * | 11/1996 | Waterman et al. | ............. | 177/145 |
| 5,740,843 A | 4/1998 | Burkart | | |
| 6,073,667 A | 6/2000 | Graffin | | |
| 6,107,579 A * | 8/2000 | Kinnemann | ................... | 177/145 |
| 6,162,998 A * | 12/2000 | Wurst et al. | .................... | 177/145 |
| 6,452,118 B1 * | 9/2002 | van Pinxteren et al. | ....... | 177/145 |
| 7,141,745 B1 * | 11/2006 | Schoon et al. | ............. | 177/25.15 |
| 7,858,889 B2 * | 12/2010 | Hahn et al. | .................... | 177/145 |
| 2003/0205414 A1 | 11/2003 | Sansone | | |

FOREIGN PATENT DOCUMENTS

| | | |
|---|---|---|
| DE | 38 09 363 A1 | 9/1989 |
| EP | 0077992 A1 | 5/1983 |
| JP | 03-93738 | 9/1991 |
| JP | 08-334404 | 12/1996 |
| JP | 2007-057239 | 3/2007 |
| JP | 2007-057409 | 3/2007 |

* cited by examiner

*Primary Examiner* — Randy W Gibson
(74) *Attorney, Agent, or Firm* — The Culbertson Group, P.C.

(57) ABSTRACT

Weighing system for weighing sequentially fed items to be weighed, in particular containers, with a weighing table, forming a preload, for receiving the weight of the item to be weighed, wherein the item to be weighed can be fed to the weighing table or removed from the weighing table along a path running across the weighing cell and wherein a clamping device, with which the item to be weighed, after it has been fed to the weighing table and impinges thereon with its weight, can be clamped detachably against a stop of the clamping device to enable being weighed in the clamped state, is provided above the weighing table as a preload.

18 Claims, 4 Drawing Sheets

WEIGHING SYSTEM INCLUDING A PRELOAD WEIGHING TABLE AND CLAMPING DEVICE FOR WEIGHING SEQUENTIALLY FED ITEMS

FIELD OF THE INVENTION

The present invention relates to a weighing system for weighing sequentially fed items to be weighed, in particular, containers.

BACKGROUND

Such systems are known in principle from prior art and are used particularly in filling systems. There, containers such as bottles or cans are filled in rapid succession and supplied one after another to a monitoring scale for the filled amount to be determined.

Such a filling device is known from DE 195 13 103 A1. Therein, containers are filled and supplied to at least one star wheel of a scale, to then be conveyed further. The star wheel has individual pockets formed to accommodate the individual containers, so that the containers can be conveyed by contact with the pocket walls and moved onto a circular track.

It proves disadvantageous, in this case, that frictional engagement with the star wheel during weighing must be prevented to determine the filled weight, i.e., the container must be released on the weighing platform. For this purpose, the star wheel is rotated backwards by a certain amount after each of the aforementioned steps, so that the container stands upright to be weighed contact-free on the weighing platform. After the weighing process has finished, the star wheel again rotates forwards in the conveyance direction and conveys the next container to be weighed onto the scale.

Even though spurious forces can be prevented by back-rotation of the star wheel, this process is not sufficient for the ever-higher transport speeds of modern filling systems. In the latter, the mass or inertia of the filled containers causes them to slip tangentially by a certain amount after the star wheel has finished a conveyance cycle, so that their final rest position is not accurately predictable. Consequently, it can happen that, during the planned slight back-rotation of the star wheel, the leading pocket wall can come back into contact with the container that has slid against it, so that a spurious force occurs and the weight cannot be precisely determined.

SUMMARY OF THE INVENTION

The problem of the invention is therefore to offer a weighing system, particularly for rapid conveyance control scales, in which the cyclically moved items to be weighed, can be weighed exactly and with a low standard deviation.

The invention provides that the weight of an item to be weighed can be determined particularly securely and exactly in a rapidly conveying filling system if the item to be weighed, transported along its predetermined (circular, linear or otherwise-shaped) conveyance path is temporarily fixed in a predetermined position before and/or during the weighing process. In particular, an uncontrolled further sliding of the containers to be weighed is prevented in this manner, so that the secure release in a defined back-rotation of the star wheel can take place and possible edge-load errors of the weighing system are negligible.

Although the invention is preferably applied to star wheels, it is equally suited to products conveyed another way, such as along a straight or irregularly curved path, to the weighing table, or conveyed away from it. Accordingly, the references below to a circular path of the products with a tangential or radial component are to be understood only as a selected, but not a limiting example.

One embodiment of the weighing system according to the invention also provides a weighing table for accommodating the weight of the item to be weighed and simultaneously lies on a weighing cell as a preload. The item to be weighed can, according to the invention, be fed to the weighing table or removed from it along a path B across the weighing table, which typically, but not necessarily, takes place in discrete, timed steps. Above the weighing table is provided a clamping device with which a product to be weighed, which has been fed to the weighing table and rests upon it, can be detachably clamped against a stop.

This yields the advantage according to the invention that the item to be weighed is held in a defined position, typically with the item to be weighed "stopped," for the weighing. This weighing preferably takes place completely within the time span in which the material to weighed is clamped, but it can also be begun before clamping or not ended until afterwards.

The invention advantageously permits weighing with a markedly smaller standard deviation than in comparable cases from prior art.

Since the position of the item to be weighed relative to the weighing table is precisely defined, the driving means (a star wheel in particular) that transports the item to be weighed can be moved or rotated after each conveyance cycle such that there is no contact with the item to be weighed and it thus rests on the weighing table with no spurious force. In particular, it is possible to prevent the item to be weighed from uncontrolled sliding after termination of the conveyance cycle.

According to the invention, the stop is part of the clamping device, which in turn forms a preload for the weighing cell. According to an advantageous embodiment of the invention, the stop is formed integrally with the weighing table. At the same time, the stop surface can be equipped with a suitable coating and/or a suitable receiving profile for fixing the item to be weighed in position by means of contact friction or positive engagement.

According to another advantageous embodiment, the clamping device according to the invention comprises at least one clamping element, with which a clamping force component directed transversely to the movement path can be applied to the item to be weighed to clamp it against the stop. While the item to be weighed is cyclically conveyed in a first direction along the path B across the weighing table, it experiences a clamping impingement transverse to this direction during a cycle. It is known from experience that no components of the clamping device are situated in the path B in a retracted or non-clamping position of the clamping element, so that the containers can be conveyed further in this case without impediment. Therefore, all components necessary for clamping advantageously lie on one or both sides of the conveyance path B.

According to another advantageous embodiment of the invention, the clamping element is constructed in the manner of a piston, and is movable by means of an actuating element. In particular, the piston is to be movable forwards and backwards transverse to the conveyance path B. It can preferably be seated in an upward-projecting wall section of the weighing table or in the plane of the weighing table, or can be guided by this section. "Piston-like" is intended to express that a not-further defined movement of the actuating element is converted into a translational or linear movement to obtain the clamping effect. (In principle, a pivoting motion of a clamping element by a rotational angle can also lead to clamping.)

In particular, the clamping element can be movable via the first end of an actuating element constructed as a connecting rod, lever or articulated element, while a second end of the actuating element is arranged eccentrically on a driving shaft. In a rotation of the driving shaft, the one end of the actuating element is moved eccentrically about the shaft axis, whereby the other end of the actuating element with a suitable linear guidance affects a corresponding linear piston movement. The special advantage of this eccentric seating of the actuating element is that any imbalance can be compensated for by suitable balancing weights in the area of the shaft or the cam. In particular, the linear motion of the piston-like clamping element can be compensated by a counterweight arranged on the cam in such a manner that no interfering forces or forces falsifying the measurement result appear. In addition, a sufficient actuation path of the clamping element can be realized with the eccentrically seated one end of the actuating element, this complete stroke being performed in half a revolution of the driving shaft.

A particularly advantageous embodiment of the inventive weighing system further provides that the actuating element be moved forward and back largely without interruption, in the manner of a periodically actuated piston, via a cam driven at a constant rotational speed, for example. Accordingly, the weighing processes take place at predetermined intervals linked to the rotational speed of the cam, more precisely, whenever the clamping element fixes an item to be weighed. Depending on the conveyance speed or "onrush" of the items to be weighed upstream of the weighing table, individual strokes of the clamping element can also be "misses," if no item to be weighed is currently being clamped. The weighing can be omitted without the homogeneous movement of the clamping element having to be stopped or restarted to perform, for example, the zeroing-out of the system during this empty cycle.

It has further been shown in tests that the item to be weighed should be impinged upon by the clamping element especially carefully or gently under certain circumstances. For this purpose, another embodiment of the invention provides that the clamping element is connected to the actuating element via at least one spring element. By avoiding a rigid connection between the clamping element and actuating element, the clamping element can be oriented within narrow tolerances independently of the position of the actuating element. At the same time, the spring can somewhat cushion the abrupt application of the clamping force to the item to be weighed, so the material is rather gently conveyed into its clamped position, and abrupt movements of its contents are reduced or avoided.

To recognize the position of the clamping element or of the actuating element operating the clamping element, an additional advantageous embodiment of the invention provides a proximity sensor with which the direct and indirect detection of the position of the actuating element is possible. This can be realized, for example, by means of a cam disk arranged on the driving shaft whose rotational position is detected by a proximity sensor. An encoder of a motor driving the clamping element or some other sensor known to those in the art can also be used here. A direct inference of the associated position of the actuating or clamping element is then easily possible, so that it is easy to recognize whether the item to be weighed is currently clamped or released. In addition to serving for position detection, a cam disk or a suitably constructed eccentric cam can also serve as a compensating balance weight, and advantageously saves space in this double function.

As explained above, the weighing system of the invention is particularly suitable for filling systems. To feed the item to be weighed onto the weighing table, the invention can provide a star wheel that is furnished with individual pockets and able to be rotated on a cyclical basis by predetermined angles of rotation. These pockets are each formed to accommodate one or more items to be weighed, which are rotated across the weighing table and, thus, convey the item to be weighed along the predetermined path B.

It can make sense for the star wheel to be rotated backwards by a predeterminable angle of rotation after feeding the item to be weighed onto the weighing table, to release the item to be weighed on the weighing table, i.e., to avoid any spurious forces.

Analogously, it is possible to provide a conveyor belt or some other transport means not transporting circularly, which stops and/or releases the item to be weighed analogously to the above-described example.

To avoid a disruptive influence on the weighing cell from the clamping element or the star wheel (or the conveyor belt), the direction of movement of the star wheel (or the conveyor belt) in the area provided for clamping is preferably selected to be perpendicular to the load introduction direction of the weighing cell. Inertial forces of the clamping element and the conveyance element then cannot influence the weighing cell. The weighing system is particularly advantageously constructed in such a manner that all three directions of motion (of the clamping element, the path of the item to be weighed at the clamping site and the load introduction direction of the weighing cell) run mutually perpendicular to one another to reduce/avoid mutual influences.

Additional advantageous embodiments follow from the subordinate claims, and the detailed description and drawings.

An exemplary embodiment of the invention will be described in detail below with reference to figures.

DETAILED DESCRIPTION OF PREFERRED EMBODIMENTS

Figure 1:
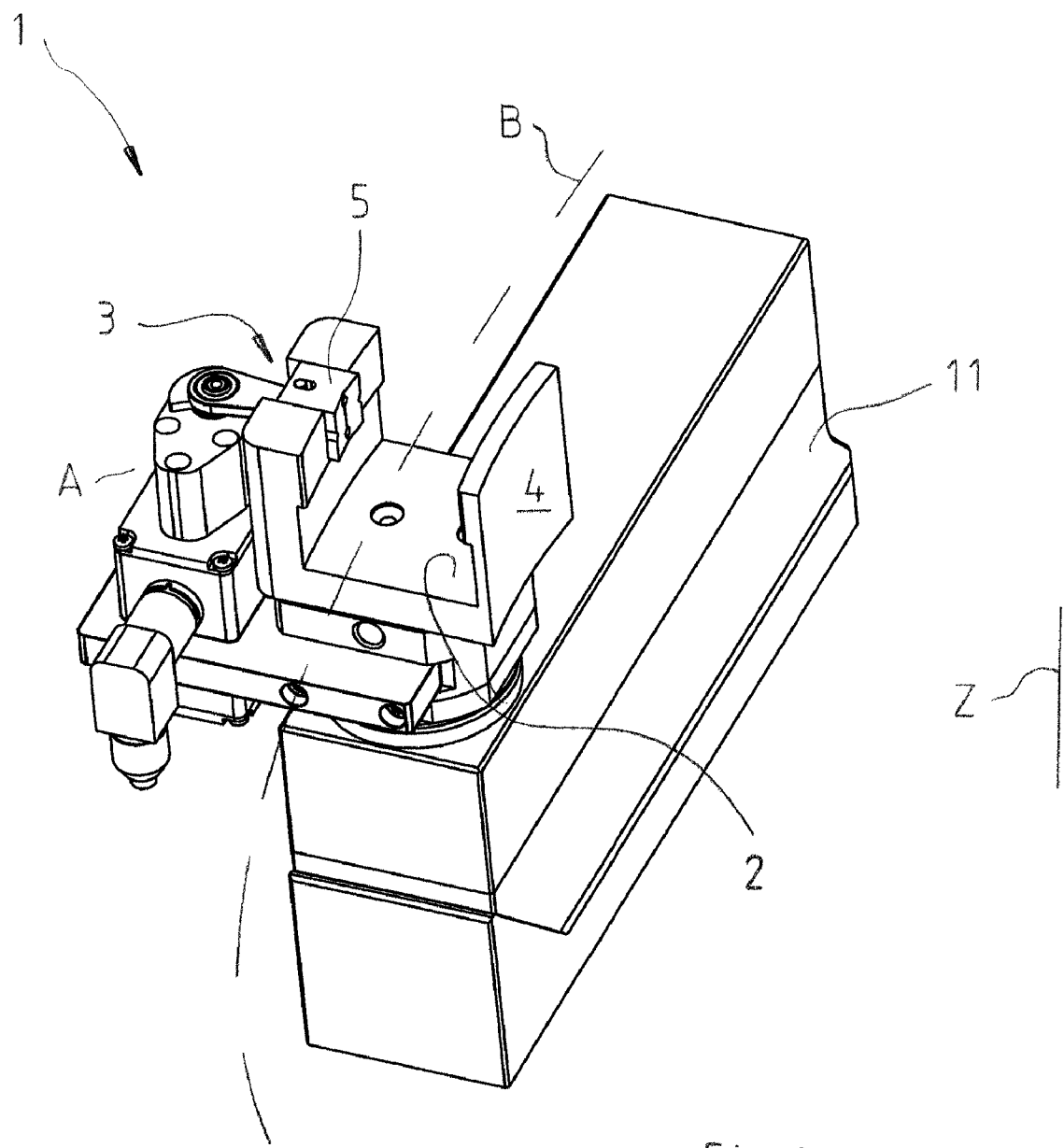
FIG. 1 shows a schematic perspective view of a weighing system according to the invention.

FIG. 1 shows a weighing system 1. It comprises a weighing cell 11 with a load receiver, not shown in detail, via which the weight to be detected is introduced into the weighing cell and processed there. A weighing table 2 having a substantially U-shaped design in a side view rests on the load receiver. A transport path B for containers to be weighed, not shown in detail, runs across weighing table 2, the containers being conveyed at least at a lower section between the two legs of the U-shaped weighing table 2. The conveyance path B is circular in shape and thus corresponds to the path of a star wheel about a schematically indicated vertical axis Z.

A clamping device 3 formed on weighing system 1 serves for temporary fixation of the item to be weighed on the weighing table 2, where the item to be weighed is clamped between a clamping element 5 and a stop 4. Stop 4 is constituted here by one leg of the U-shaped weighing table, while clamping element 5 is guided in the other leg of the weighing table via guidance means 12 in FIG. 2, so that it is preferably movable backwards and forwards radially or perpendicular to the path B, the stroke being limited by a path limiter 13 in FIG. 2. Clamping element 5 is driven via a cam by means of an electric drive unit A, with clamping device 3, weighing table 2 and drive unit A jointly lying on the load receiver of weighing cell 11 as a preload.

Figure 2:
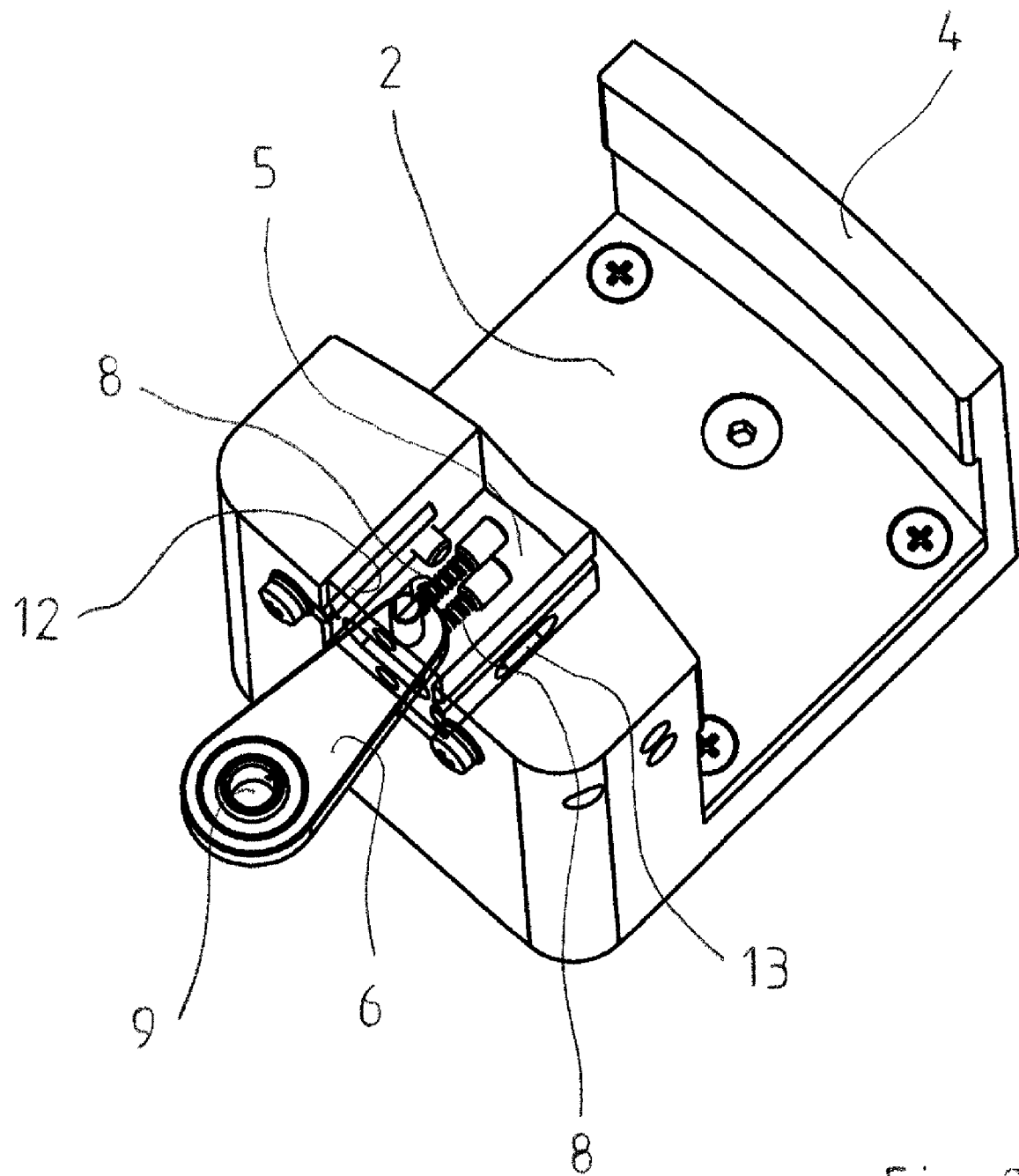
FIG. 2 is a detailed view of the system according to FIG. 1.

FIG. 2 shows the cut-away weighing table 2 with a detailed representation of clamping element 5. It is clearly visible that clamping element 5 can be acted upon by an actuating element 6 and springs 8 arranged there between to be moved radially or in the direction perpendicular to the path B towards the opposing stop 4 or away from it. The free end of actuating element 6 has a hole 9 for being placed upon an eccentric pin 9' in the manner of a connecting rod.

Figure 3:
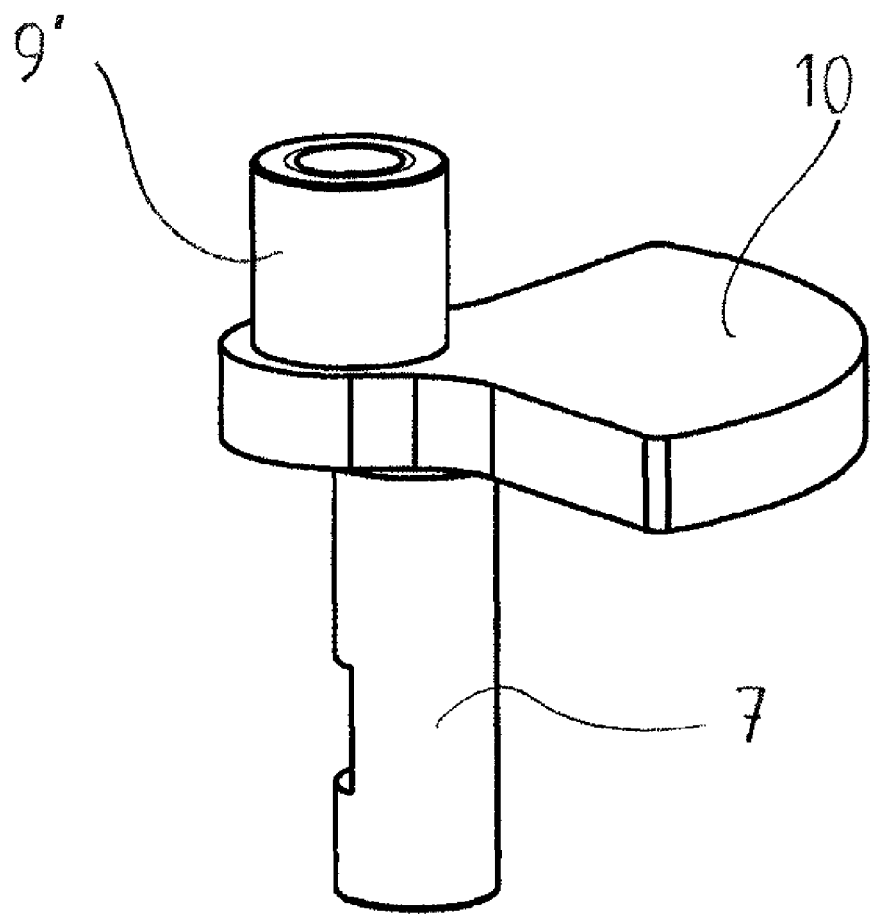
FIG. 3 is a driving shaft of the inventive system with an eccentric cam and a counterweight.

FIG. 3 shows the eccentric pin 9', which is formed eccentrically with respect to a driving shaft 7. To compensate for an imbalance, a balancing weight 10, by means of which the inertial forces in a clamping movement can be equalized, is arranged on driving shaft 7.

The mode of operation of the weighing system according to the invention can be illustratively explained according to FIG. 1. A star wheel, see, for example, FIG. 4, rotates about the Z axis and conveys a container to be weighed along the conveyance path B onto weighing table 2. Drive unit A powers driving shaft 7 with eccentric pin 9' in such a manner that actuating element 6 connected thereto presses against spring 8 and the latter against clamping element 5, so that it is moved radially (or perpendicular to path B) towards stop 4 to temporarily clamp the container situated there between. Insofar as it is necessary, the star wheel can be rotated such that it does not contact the container to be weighed ("releases" it), to avoid spurious forces. While the container is clamped between clamping element 5 and stop 4, or even after this clamping has been released, the weight of the container can be detected via the load receiver of weighing cell 11 and processed. Then the star wheel is moved on by a suitable angle of rotation in the conveyance direction, so that the next container to be weighed comes to rest on the weighing table.

It is conceivable for the star wheel to radially convey several containers one next to another, the weights of which to be detected by respective separate weighing cells. In this case, several weighing systems according to the invention can be arranged one next to another in the radial direction, with the star wheel feeding one respective container to each of the weighing cells, or conveying it away therefrom, in each cycle. The weighing cells would preferably be arranged in this case along concentric paths B one next to another in the radial direction, or offset from one another in the circumferential direction.

Figure 4:
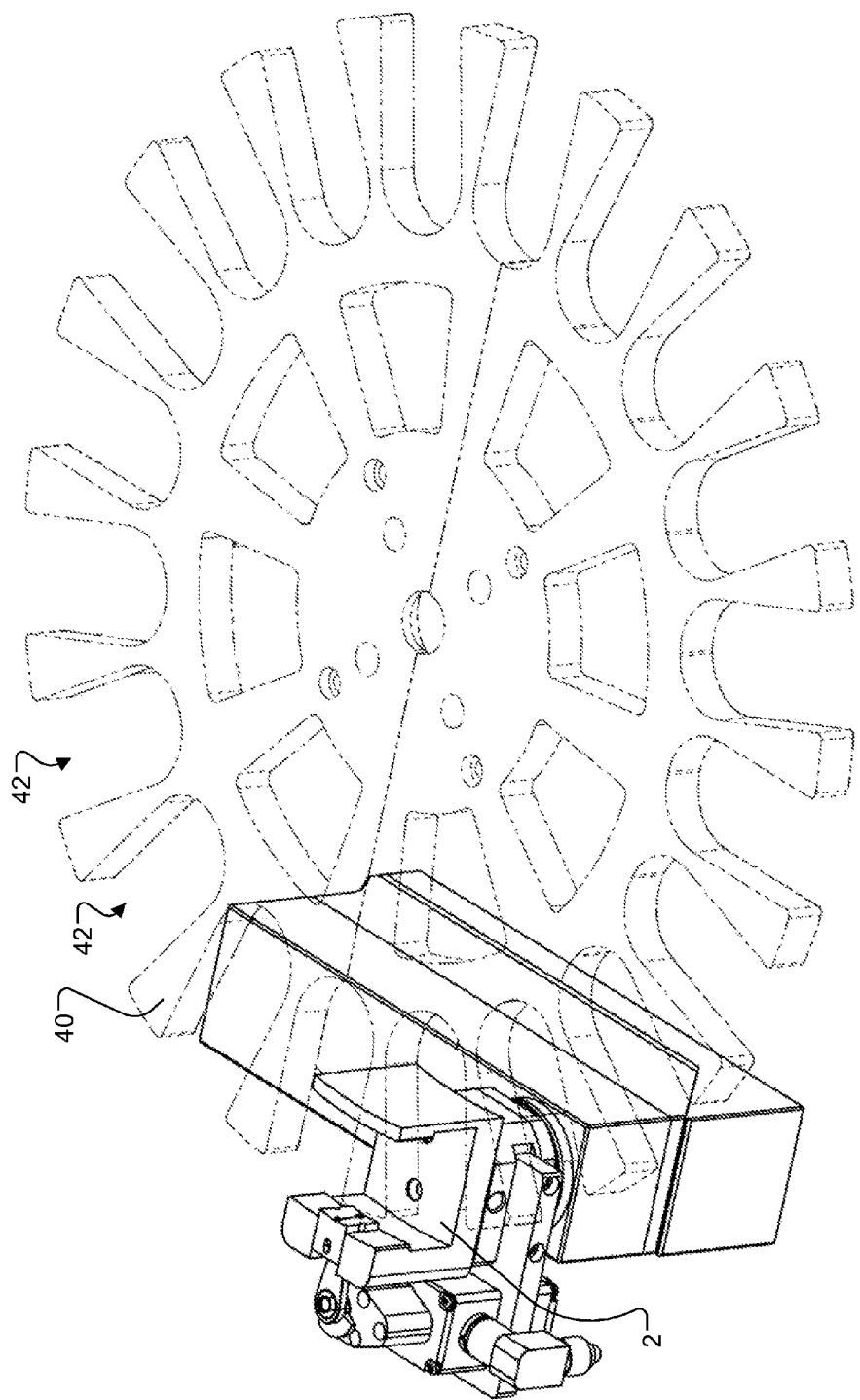
FIG. 4 is a perspective view of a weighing table in relation to a star wheel device.

FIG. 4 is a perspective view of a weighing table 2 in relation to a star wheel 40, shown in generic outline form. To feed the item to be weighed onto the weighing table, the invention can provide a star wheel 40 that is furnished with individual pockets 42 and able to be rotated on a cyclical basis by predetermined angles of rotation. These pockets 42 are each formed to accommodate one or more items to be weighed, which are rotated across the weighing table 2 and, thus, convey the item to be weighed along a predetermined path across the weighing table.

As used herein, the terms "comprising," "including," "having," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weighing system for weighing items that are sequentially fed to be weighed, the weighing system comprising:
   (a) a weighing table constituting a preload for receiving the weight of an item to be weighed;
   (b) wherein the weighing table is adapted so that the item to be weighed can be fed to the weighing table and removed from the weighing table along a movement path across the weighing table; and
   (c) wherein a clamping device is provided above the weighing table as the preload, with which the item to be weighed, after it has been fed to the weighing table and impinges thereon with its weight, can be detachably clamped against a stop, which is fixed with respect to the weighing table, of the clamping device to enable being weighed in a clamped state.

2. The weighing system of claim 1, wherein the weighing system is further constructed for supplying the item to and removing it from the weighing table individually on a cyclical basis.

3. The weighing system of claim 1, wherein the stop is stationary in construction.

4. The weighing system of claim 1, wherein the clamping device comprises at least one clamping element, with which a clamping force component directed transversely to the movement path can be applied to the item to be weighed to clamp it against the stop.

5. The weighing system of claim 4, wherein the stop is integrally formed with the weighing table.

6. The weighing system of claim 4, further comprising a guide means adapted for guiding the clamping element and integrally formed with the weighing table.

7. The weighing system of claim 4, wherein, at a point of clamping, the movement direction of the clamping element and the path run perpendicular to a load introduction direction of a weighing cell coupled to the weighing table.

8. The weighing system of claim 7, wherein the movement direction of the clamping element, the path and a load introduction direction of the weighing cell run perpendicular to one another at a point of clamping.

9. The weighing system of claim 4, wherein the clamping element is formed in the manner of a piston and adapted to be moved via an actuating element.

10. The weighing system of claim 4, wherein the clamping element can be moved via a first end of an actuating element constructed as a connecting rod, a lever, or an articulated lever, while a second end of the actuating element is coupled to an eccentric drive element driven by a driving shaft.

11. The weighing system of claim 4, wherein the clamping element can be moved via a first end of an actuating element constructed as a connecting rod, a lever, or an articulated lever, while a second end of the actuating element is coupled to a pneumatic, electrical or electromagnetic drive unit.

12. The weighing system of claim 11, wherein the clamping element is connected via at least one spring element to the actuating element.

13. The weighing system of claim 11, wherein a sensor, is provided for direct or indirect position detection of the actuating element to determine a current position of the clamping element.

14. The weighing system of claim 4, wherein, to feed the item to be weighed onto the weighing table, a star wheel that is furnished with individual pockets and able to be rotated on a cyclical basis by predetermined angles of rotation is provided, the pockets of the star wheel being formed to accommodate one or more items to be weighed and to convey the items along the movement path.

15. The weighing system of claim 14, wherein the star wheel is constructed for simultaneous conveyance of several containers one next to another in a radial direction, each of which is to be detected by separate weighing cells, wherein the weighing cells are arranged along concentric paths one next to another in the radial direction.

16. The weighing system of claim 15, wherein the weighing cells are also arranged offset to one another in a circumferential direction.

17. The weighing system of claim 14, wherein the star wheel is adapted to be rotated backwards by a predeterminable angle of rotation after feeding the item to be weighed onto the weighing table, to release the item to be weighed on the weighing table.

18. The weighing system of claim 13, wherein the sensor comprises a proximity sensor or an encoder.

* * * * *